(12) United States Patent
Shkolnikov et al.

(10) Patent No.: US 11,478,793 B2
(45) Date of Patent: Oct. 25, 2022

(54) MICROFLUIDIC DEVICES

(71) Applicant: HEWLETT-PACKARD DEVELOPMENT COMPANY, L.P., Spring, TX (US)

(72) Inventors: Viktor Shkolnikov, Palo Alto, CA (US); Chien-Hua Chen, Corvallis, OR (US); Michael W Cumbie, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 107 days.

(21) Appl. No.: 16/605,619

(22) PCT Filed: Oct. 30, 2017

(86) PCT No.: PCT/US2017/059116
§ 371 (c)(1),
(2) Date: Oct. 16, 2019

(87) PCT Pub. No.: WO2019/088983
PCT Pub. Date: May 9, 2019

(65) Prior Publication Data
US 2021/0299662 A1 Sep. 30, 2021

(51) Int. Cl.
*B01L 3/00* (2006.01)
*G01N 15/14* (2006.01)

(52) U.S. Cl.
CPC ... *B01L 3/502738* (2013.01); *B01L 3/502707* (2013.01); *G01N 15/1484* (2013.01); *B01L 2300/0887* (2013.01); *B01L 2400/0677* (2013.01)

(58) Field of Classification Search
None
See application file for complete search history.

(56) References Cited

U.S. PATENT DOCUMENTS 8,900,763 B2    12/2014  Lundblad et al.
9,127,782 B2    9/2015   Allain et al.
(Continued)

FOREIGN PATENT DOCUMENTS

EP    2738431 A1    6/2014
RU    2587628 C1    6/2016
(Continued)

OTHER PUBLICATIONS

Translation of WO2013/075871A1 (Year: 2013).*
(Continued)

*Primary Examiner* — Lore R Jarrett
(74) *Attorney, Agent, or Firm* — Dierker & Kavanaugh PC

(57) ABSTRACT

In an example implementation, a microfluidic device includes a first layer with a first microfluidic channel and a second layer with a second microfluidic channel. The first and second channels are adjacent to one another at a channel intersection, and a conductive membrane valve extends across and covers the channel intersection to separate the first and second channels. The microfluidic device includes a conductive trace to open the membrane valve and join the first and second channels by supplying an electric current to heat and melt a thinned region of the membrane valve.

14 Claims, 5 Drawing Sheets

(56) References Cited

U.S. PATENT DOCUMENTS

| | | | |
|---|---|---|---|
| 2005/0084424 A1* | 4/2005 | Ganesan | B01L 3/50273 |
| | | | 422/400 |
| 2005/0205136 A1* | 9/2005 | Freeman | A01K 11/006 |
| | | | 137/554 |
| 2008/0261276 A1* | 10/2008 | Ponjee | B01L 3/502715 |
| | | | 435/91.2 |
| 2015/0167863 A1 | 6/2015 | Mescher et al. | |
| 2016/0082432 A1* | 3/2016 | Katsumoto | B01L 3/502 |
| | | | 422/501 |
| 2016/0319944 A1 | 11/2016 | Ichiki et al. | |
| 2017/0211809 A1 | 7/2017 | Fuller et al. | |

FOREIGN PATENT DOCUMENTS

| | | | | |
|---|---|---|---|---|
| WO | WO2013075871 A1 * | 5/2013 | | B01L 3/00 |
| WO | WO2013075871 A1 | 5/2013 | | |
| WO | WO2013134745 | 9/2013 | | |

OTHER PUBLICATIONS

Selvaganapathy, P. et al., Electrothermally Actuated Inline Microfluidic Valve, Sensors and Actuators A Physical, May 2003, pp. 275-282, pulled from the internet on Oct. 17, 2014, http://www.sciencedirect.com/science/article/pii/S092442470300030X.

* cited by examiner

MICROFLUIDIC DEVICES

BACKGROUND

Lab-on-a-chip (LOC) devices enable the scaling down of laboratory functions to a miniaturized environment. The implementation of LOC devices involves the integration of a variety of components into a very small form factor. While research using LOC devices often focuses on human diagnostics and DNA analysis, LOC devices are applicable for laboratory analysis in a variety of technological fields including chemical analysis, environmental monitoring, medical diagnostics, pharmaceutical testing, and so on. LOC devices enable multiple analyses to be performed on a single chip using very small volumes of fluid. The use of LOC devices can improve diagnostic and analytical outcomes and reduce costs associated, for example, with reduced sample volumes, parallel analysis of different samples, reduced human error, faster response times, ease of use, compactness, expendability, and so on.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
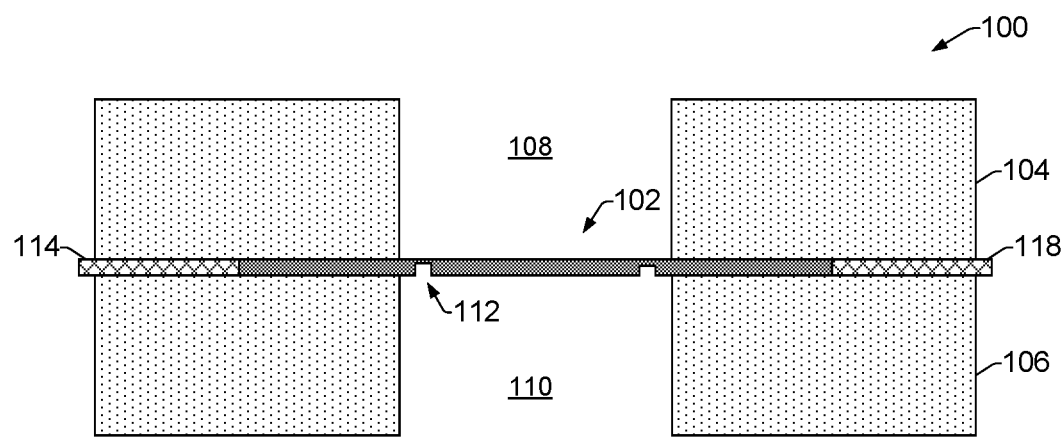
FIG. 1 shows a cross sectional side view of a portion of an example microfluidic device in which an example microfluidic conductive membrane valve can be implemented to control the flow of fluid or other reagents between microfluidic channels within the microfluidic device.

Lab-on-a-chip (LOC) devices are used in different life science and other industries for a variety of purposes such as biomedical diagnostics, drug development, DNA replication, and so on. Laboratory functions performed on LOC devices often rely on different fluid sample preparations. Preparing samples can involve the mixing of fluids, the filtering of fluids, the heating of fluids, combinations thereof, and so on. Microfluidics involves the manipulation and control of such fluids within the miniaturized LOC environments through the integration and implementation of a variety of components into a very small form factor. Such components can include, for example, integrated pumps, electrodes, valves, electronics, and the like.

Disposable microfluidic LOC devices often implement one-time openable valves, for example, to orchestrate sequential chemical operations. Current valve designs, including current designs for mechanical valves, bubble valves, capillary valves, and membrane valves, however, can have different physical and operational features that tend to increase costs and hinder performance. Mechanical valves, for example, involve the use of mechanical actuators to enable their valving functions. Mechanical actuators for activating the mechanical valves are not located on the microfluidic device itself, but are instead integrated into the microfluidic LOC device reader. Microfluidic LOC device readers generally comprise a user interface, a power supply, a mounting station to mount microfluidic LOC devices, a controller, a substance-reading component, and other components that facilitate the functions of the microfluidic LOC device and the monitoring and analysis associated with those functions. For microfluidic LOC devices implementing mechanical valves, device readers additionally include integrated mechanical actuators that enable the actuation of mechanical valves on the LOC devices. Because the mechanical actuators tend to be bulky and costly, the number of mechanical valves that can be placed on each microfluidic LOC device is limited.

Membrane valves, such as quake valves, comprise substrates that contain flexible material, which is frequently comprised of PDMS (polydimethylsiloxane). PDMS material can have unwanted chemical interactions (e.g., protein absorption, gas permeability) with reagents provided within the channels and/or chambers of microfluidic chip devices. In addition, current membrane valves are often actuated pneumatically. As with the mechanical actuation of mechanical valves noted above, pneumatic actuation of such membrane valves involves the integration of a bulky and costly pneumatic infrastructure within the reader device. Some drawbacks with bubble and capillary valves include that they tend to be low fidelity components that allow leading of reagents between valved regions within microfluidic LOC devices. Bubble and capillary valves tend to have low fidelity, often allowing leaking of reagents between the valved regions.

Accordingly, example microfluidic devices and related methods described herein enable high fidelity, one-time openable, conductive membrane, microfluidic valves that can be electrically actuated in a manner that leverages existing electrical infrastructure within microfluidic device readers. Example microfluidic valves may be alternately referred to herein as conductive membrane valves, one-time openable valves, electrically actuatable microfluidic valves, variations thereof, and so on. The conductive membrane microfluidic valves leverage existing electronics that are, in general, already designed within microfluidic LOC devices. Accordingly, the conductive membrane microfluidic valves help to avoid costs associated with having to integrate bulky mechanical and pneumatic actuators within microfluidic device readers. The microfluidic valves are scalable in size and can be readily integrated into both high resolution microfluidics (e.g., silicon devices) and low resolution microfluidics (e.g., fluid molded interconnect devices). The microfluidic valves have a small physical footprint, which enables large numbers of the valves to be implemented within a single microfluidic device. Unlike bubble and capillary valves, the conductive membrane microfluidic valves are high fidelity valves that can prevent leaking within microfluidic devices for both gas and fluid reagents.

Examples of conductive membrane microfluidic valves described herein comprise an electrically conductive membrane or film that can be sandwiched between two microfluidic channels or vias that are formed within adjacent layers of a microfluidic device. Example conductive membrane valves comprise a variable cross section area that can include thinned membrane regions. In a closed state, a conductive membrane valve can separate two microfluidic channels at a channel intersection location, or via location, where the channels intersect between two different layers of a microfluidic device. In a closed state, a conductive membrane valve is both gas an liquid impermeable and acts as a solid rigid barrier between the two channels.

The example conductive membrane valves are coupled to at least one source electrode and one sink electrode. To open or actuate a conductive membrane valve separating two microfluidic channels, current can be passed between the two electrodes. In some examples, the current comprises a short duration, high current pulse. The thinned membrane regions of low cross sectional area provide resistance to the flow of current, which generates heat that can melt the thinned membrane regions, effectively puncturing the conductive membrane valve and allowing fluid to pass between the two microfluidic channels. The terms melt and melting as generally used throughout this description, are intended to indicate any type of destruction, disintegration, sublimation, oxidation, burning, or other dissolution of thinned membrane regions due to a flow of electric current through the thinned membrane regions. In some examples, a main gate portion of a conductive membrane valve can become separated from the remainder of the conductive membrane valve when the thinned membrane regions melt or are disintegrated, thus opening the conductive membrane valve and allowing fluid to pass from one channel to the other. In some examples, electric current can cause melting or destruction of a thinned membrane region to enable a main gate portion of the conductive membrane valve to swing open like a hinged gate. In some examples, multiple areas of a conductive membrane valve can be opened independently by causing melting or destruction of corresponding thinned membrane regions, enabling a conductive membrane valve to provide variable fluid flow control between the microfluidic channels.

Example conductive membrane valves described herein comprise one-time openable microfluidic valves. That is, once the conductive membrane valve, or portion thereof, has been actuated or opened, it does not close again. Thus, the conductive membrane valves are digital valves in that they are closed in a first state to prevent the flow of fluid between two separated microfluidic channels, and they are opened in a second state to allow the flow of fluid between the two channels.

In a particular example, a microfluidic device includes a first layer with a first microfluidic channel and a second layer with a second microfluidic channel. The first and second channels are adjacent to one another at a channel intersection, and a conductive membrane valve extends across and covers the channel intersection to separate the first and second channels. The microfluidic device includes a conductive trace to open the membrane valve and join the first and second channels by supplying an electric current to heat and melt a thinned region of the membrane valve.

In another example, a method of joining microfluidic channels in a microfluidic device includes providing within the microfluidic device, a first microfluidic channel running through a first microfluidic layer and a second microfluidic channel running through a second microfluidic layer. The first and second channels form a channel intersection where the first and second channels are adjacent to one another. The method includes providing a conductive membrane valve at the channel intersection to separate the first and second channels, and further providing a conductive trace to enable electric current to flow through and melt a thinned area of the conductive membrane valve to join the first and second channels.

In another example, a microfluidic valve in a microfluidic device includes an electrically conductive membrane valve extended between two microfluidic channels at an intersection of the channels within a microfluidic device. The microfluidic valve includes a thinned cross-sectional area formed in the conductive membrane valve. The microfluidic valve includes an electrically conductive trace coupled to the conductive membrane valve to enable an electrical current to flow through the conductive membrane valve. The electrical current is to heat up and melt the thinned cross-sectional area and to cause the conductive membrane valve to open.

FIG. 1 shows a cross sectional side view of a portion of an example microfluidic device 100 in which an example one-time openable, microfluidic conductive membrane valve 102 can be implemented to control the flow of fluid or other reagents between microfluidic channels within the microfluidic device 100. The example microfluidic device 100 includes first and second microfluidic layers 104 and 106, formed adjacent to one another with the first layer 104 shown arbitrarily on top of the second layer 106. The first layer 104 (top layer) and the second layer 106 (bottom layer) comprise respective microfluidic channels 108 (upper channel) and 110 (lower channel) formed therein. While a microfluidic device 100 is shown and described herein generally as having two layers, where each layer includes a microfluidic channel formed therein, other microfluidic device configurations are possible and are contemplated. For instance, in some examples, a microfluidic device 100 may have three or more layers, with each layer having one or multiple microfluidic channels.

The conductive membrane valve 102 can be sandwiched between the two microfluidic layers 104, 106, and extend across a location between the two layers where the two channels 108, 110, are adjacent to one another and form a channel intersection. The conductive membrane valve 102 is operational in a first or closed state, to separate the adjacent channels 108 and 110 at the channel intersection location, and to prevent the mixing and/or flow of reagent substances (e.g., fluids, gases) between the channels. In a second or opened state, the conductive membrane valve 102 is opened up to join the adjacent channels 108 and 110 at the channel intersection location, which enables the mixing and/or flow of reagent substances between the channels.

The fabrication techniques and materials used in forming such microfluidic devices 100 are generally understood and are therefore not described in detail herein. Briefly, however, some of the techniques for forming such microfluidic devices can include, for example, wet or dry etching of silicon or glass microfluidic chips, thermoforming techniques such as hot-roll embossing and injection molding, polymer casting using lithographic processes, and techniques using micro-machines and/or lasers.

An example microfluidic conductive membrane valve 102 comprises, for example, a metalized plastic film or membrane that can be formed of multiple layers. In some examples, the conductive membrane valve 102 can include a first metal outer layer and a second metal outer layer with a third plastic inner layer sandwiched in between the outer layers. In some examples, the conductive membrane valve 102 can comprise two layers that include a single metal layer sandwiched against a plastic layer. Some examples of metals that can be used in a conductive membrane valve 102 include, but are not limited to, nickel, chromium, aluminum, alloys thereof, and so on. Some examples of plastics that can be used in a conductive membrane valve 102 include, but are not limited to, nylon, polyethylene, polypropylene, and polyethylene terephthalate. In some examples, the conductive membrane valve 102 comprises a thermal insulative coating. The thermal coating can help concentrate thermal energy within the thinned cross sectional area regions, reduce heat transfer from the thinned regions into reagent fluids or other substances within microfluidic channels, and generally minimize temperature rise in the reagent fluids within the channels. In some examples, the conductive membrane valve 102 comprises an inert material coating to prevent chemical interaction between the membrane valve material and a reagent substance within a microfluidic channel. In some examples, an inert material coating can be on the order of 100 nm thick and include, for example, materials such as Au, Pt, SiO2, parlene (Poly-Para-Xylylene), silicones, polyurethanes, fluorinated ethylene-propylene, and so on.

Figure 2:
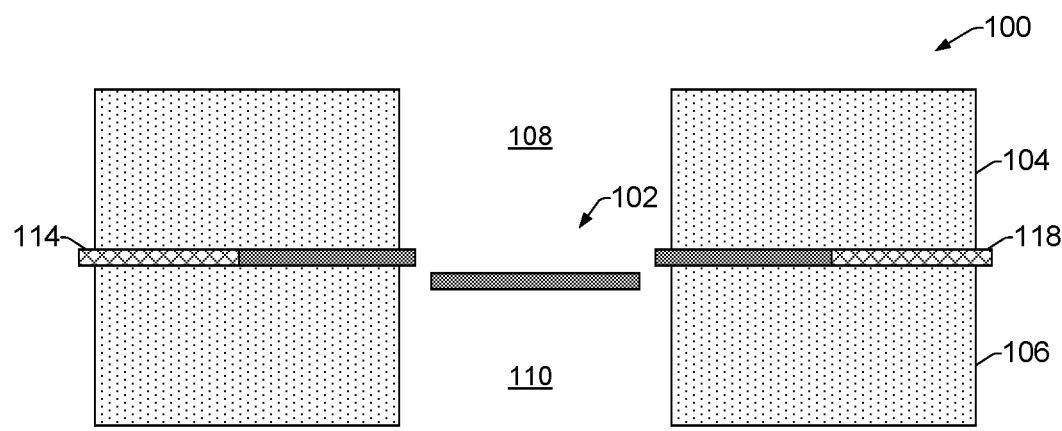
FIG. 2 shows an example microfluidic device after thinned cross section regions of a conductive membrane valve have been melted away with heat, causing a gate section of the conductive membrane valve to open.
Figure 3:
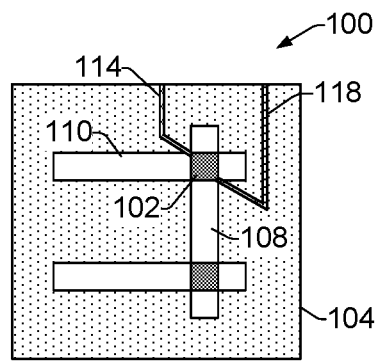
FIG. 3 shows a top view of a portion of an example microfluidic device with two microfluidic channels separated at a channel intersection by a conductive membrane valve.

As shown in FIG. 1, an example one-time openable, conductive membrane valve 102 comprises a variable cross section area that includes at least one thinned cross section region 112. Thinned regions 112 can be formed, for example, by scoring or stamping. FIG. 2 shows the example microfluidic device 100 of FIG. 1 after thinned cross section regions 112 have been melted away with heat, causing a gate section 113 of the conductive membrane valve 102 to become separated from a portion of the conductive membrane valve 102 that remains sandwiched between the two microfluidic layers 104, 106. FIG. 3 shows a top view of a portion of an example microfluidic device 100 in which two microfluidic channels 108, 110, are shown as transparent to enable viewing a microfluidic conductive membrane valve 102 separating the channels at a channel intersection location.

Figure 4:
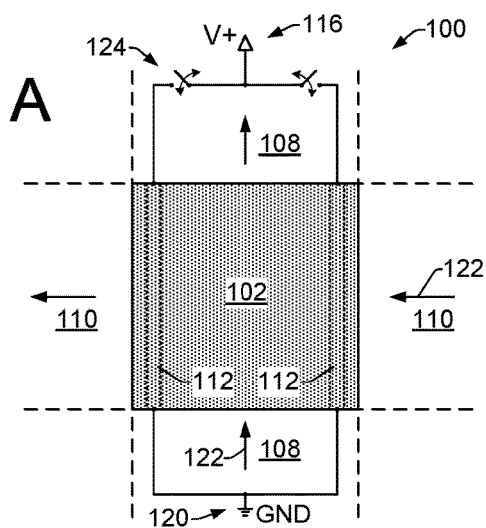
FIGS. 4A and 4B show an example conductive membrane valve with two intact thinned regions spanning across an intersection area between two microfluidic channels.
Figure 4:
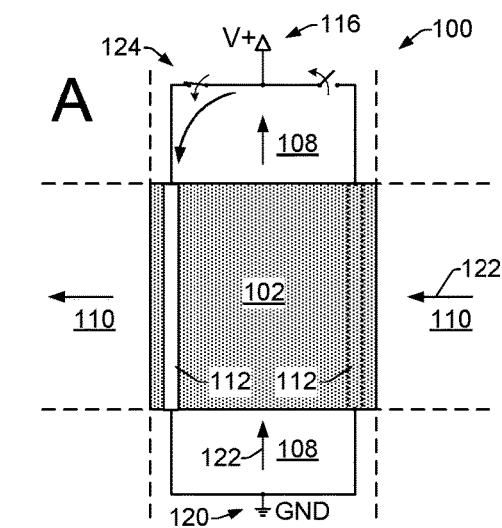
Figure 4:
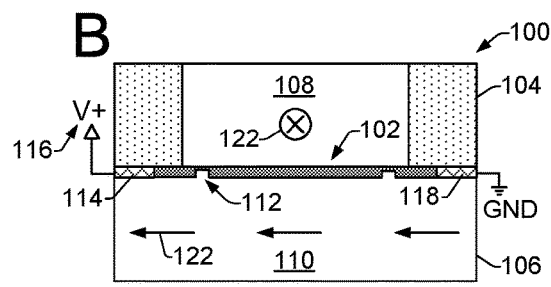
Figure 5:
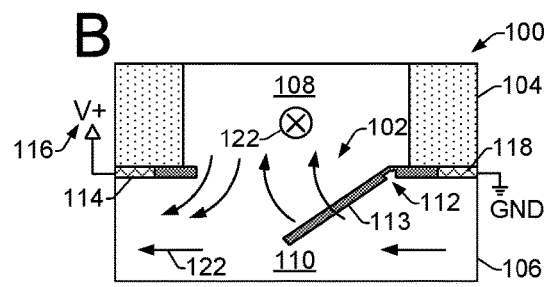
FIGS. 5A and 5B show an example conductive membrane valve where electric current has been applied to and melted one of two thinned regions.
Figure 6:
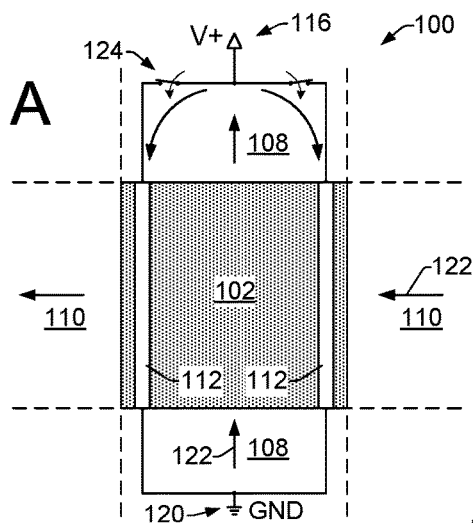
FIGS. 6A and 6B show an example conductive membrane valve where electric current has been applied to and has melted both thinned regions on the valve, allowing a gate section of the valve to become disconnected.
Figure 6:
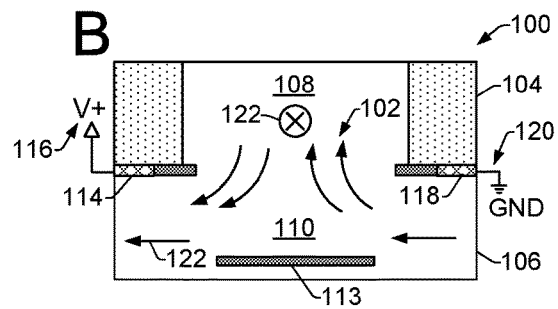

Referring generally to FIGS. 1-3, the conductive membrane valve 102 can be coupled to at least one source electrode 114 which can be connected to a source voltage 116 (see FIGS. 4-6), and at least one sink electrode 118 coupled to a ground 120 (FIGS. 4-6). Connections to a source voltage 116 and a ground 120 can be made, for example, when the microfluidic device 100 is mounted in a device reader (FIG. 8). The electrodes 114, 118, enable electric current to flow through the valve 102 to actuate or open the valve. In some examples, as discussed below with reference to FIGS. 7A and 7B, multiple source and sink electrodes can be coupled to the conductive membrane valve 102 to enable the actuation of multiple different sections of the valve. To actuate or open the one-time openable conductive membrane valve 102, electric current is passed between the electrodes 114 and 118. The thinned regions 112 are designed to restrict the flow of current through the conductive membrane valve 102. Restriction of the current flow through the thinned regions 112 of the valve 102 generates heat that melts or disintegrates the thinned regions 112, resulting in the opening of the valve 102, or a section or sections of the valve 102. As shown in FIG. 2, for example, the application of electric current across an example conductive membrane valve 102 has melted thinned regions 112 and opened a gated section 113 of the valve 102.

In some examples, electric current can be applied as a current pulse across a conductive membrane valve 102, or sections of a conductive membrane valve 102. In some examples, a current pulse provided to open the conductive membrane valve 102 or sections thereof, can have a duration that lasts less than or on the order of $0.01 L^2/D$, where L is the characteristic diameter (e.g., the height) of the microfluidic channels and D is the thermal diffusivity of the reagent fluid within the channels. A current pulse less than or on the order of $0.01 L^2/D$ can help to minimize the penetration of thermal energy into the reagent. In a particular example, using an aqueous based reagent fluid and a microfluidic channel with a 200 μm diameter, a current pulse time limit would be 3 ms (milliseconds).

FIGS. 4, 5, and 6, provide an example illustration of a process of opening a conductive membrane valve 102 within a microfluidic device 100. FIGS. 4, 5, and 6, each provide a top view, labeled "A", that shows arrows 122 representing reagent fluids flowing through two microfluidic channels 108, 110. FIGS. 4, 5, and 6, additionally provide a side cross-section view, labeled "B", that corresponds with the top view "A". Similar to the devices in FIGS. 1-3 discussed above, the microfluidic channels 108, 110 are formed within respective upper and lower layers 104, 106 of the example microfluidic device 100. The direction of reagent fluid flow indicated by arrows 122 is arbitrary. Furthermore, in some examples, reagent fluid may not be flowing in any particular direction, but may instead be generally stationary within a microfluidic channel or chamber 108, 110.

Referring to FIGS. 4A and 4B, an example conductive membrane valve 102 is shown spanning across an intersection area between the two microfluidic channels 108, 110 where the channels are adjacent to one another with channel 108 positioned in layer 104 over channel 110 positioned in layer 106. In this example, the conductive membrane valve 102 includes two intact thinned regions 112 coupled between electrodes 114 leading to a source voltage 116 and sink electrodes 118 leading to a ground 120. Thus, in this example, the two thinned regions 112 can be controlled (i.e., melted) separately by applying current independently across the thinned regions 112. In other examples, electrodes 114 and 118 can be coupled to the conductive membrane valve 102 in different orientations to control the melting of thinned regions 112 in different ways. For example, electrodes 114 and 118 can be coupled to the conductive membrane valve 102 such that applied current flows through both of the two thinned regions 112 to heat and melt the regions 112 simultaneously.

Control switches 124 are shown in FIGS. 4, 5, and 6, merely for the purpose of illustrating a controlled application of electric current to the conductive membrane valve 102. There is no intent to indicate that such control switches 124 are physically present within the example microfluidic devices 100 of FIGS. 4, 5, and 6. Instead, control mechanisms represented by such switches 124 can be implemented using a controller of a microfluidic device reader, such as the example microfluidic device reader 128 shown in FIG. 8, and discussed below. As shown in FIGS. 4A and 4B, the control switches 124 are both open, indicating that no electric current is being applied to the conductive membrane valve 102. Accordingly, in FIGS. 4A and 4B, the two thinned regions 112 of valve 102 remain intact.

As shown in FIG. 5A, a control switch 124 is shown in a closed position, indicating electric current is being applied to one of the thinned regions 112 (i.e., the thinned region on the left of the valve 102). As FIGS. 5A and 5B illustrate, application of electric current has melted or disintegrated the thinned region 112 on the left of the valve 102. In this example, the thinned region 112 on the right side of the conductive membrane valve 102 remains intact. As a result, the two microfluidic channels 108, 110 are joined as the thinned region 112 on the left melts away allowing the gate section 113 of the valve 102 to swings open. As the gate section 113 opens, it allows reagent fluid to flow between the microfluidic channels 108, 110.

As shown in FIG. 6A, both of the control switches 124 are shown in a closed position, indicating that electric current is being applied to both of the thinned regions 112 of the conductive membrane valve 102. As FIGS. 6A and 6B illustrate, application of electric current has melted or disintegrated both the thinned regions 112 on the left and right sides of the valve 102. In this example, the two microfluidic channels 108, 110 are joined as the thinned regions 112 both melt away allowing the gate section 113 of the valve 102 to become disconnected from the valve and fall away. As the gate section 113 separates from the valve 102, it opens up the valve 102 and allows reagent fluid to flow between the microfluidic channels 108, 110.

Figure 7A:
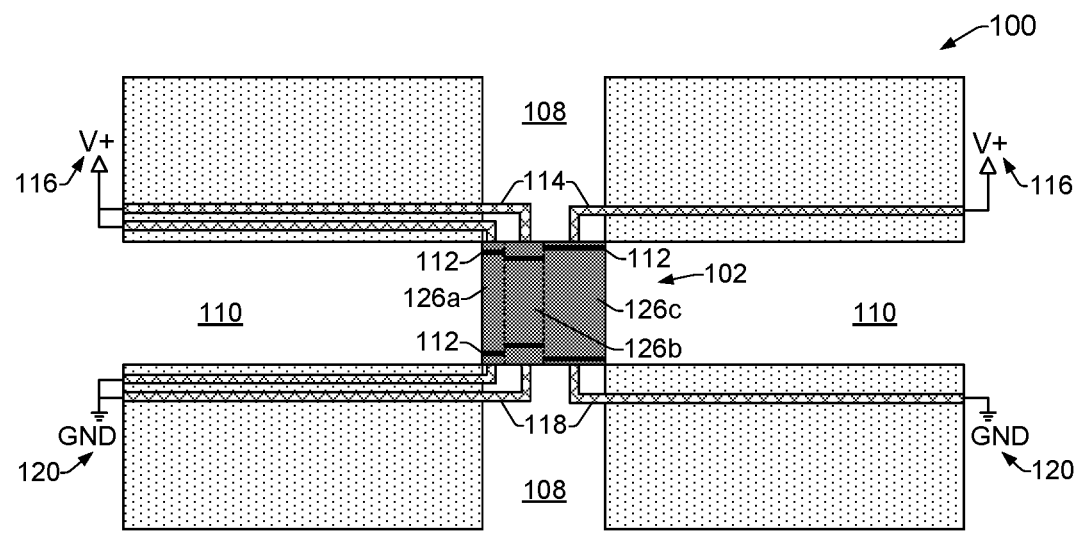
FIGS. 7A and 7B show a top view of an example microfluidic device with a conductive membrane valve between two microfluidic channels where the conductive membrane valve includes multiple different valve sections.
Figure 8:
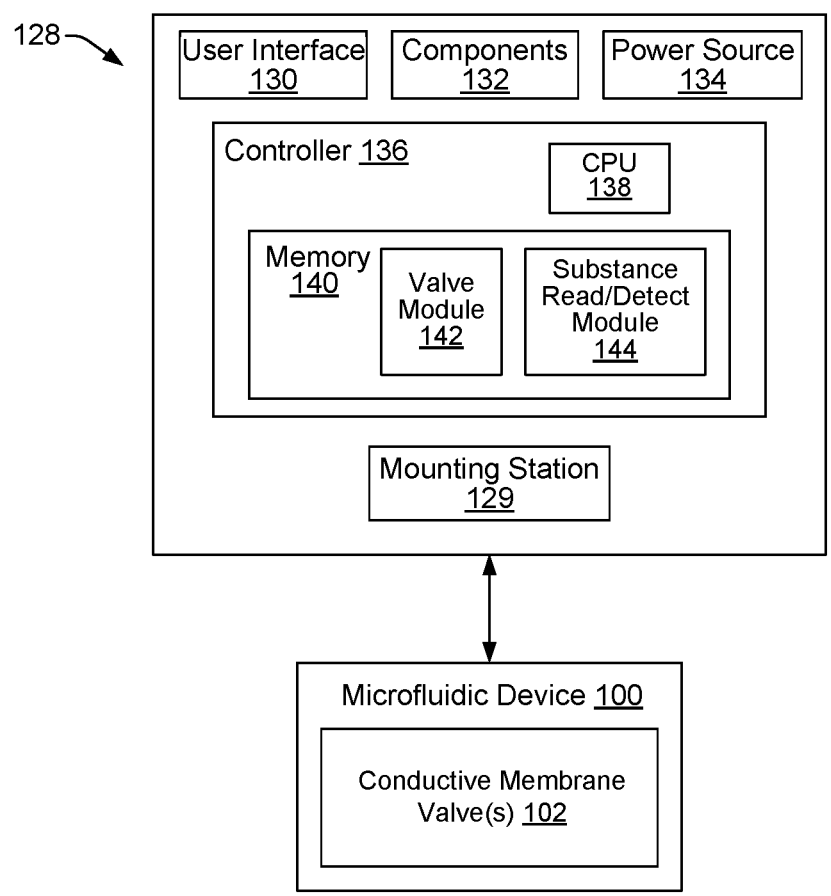
FIG. 8 shows an example of a microfluidic device reader suitable to receive a microfluidic device and provide electric current to controllably actuate a conductive membrane valve and/or different sections of a conductive membrane valve; and, FIG. 9 shows a flow diagram of an example method of joining microfluidic channels within a microfluidic device.

FIG. 7A shows a top view of an example microfluidic device 100 with a conductive membrane valve 102 between two microfluidic channels 108, 110, where the conductive membrane valve 102 includes different valve sections 126 (illustrated as sections 126a, 126b, 126c). Each valve section 126 can be independently opened based on independent control of thinned regions 112 associated with each valve section, effectively making the conductive membrane valve 102 a variable flow control valve. Each valve section 126 can comprise thinned regions 112 that can be independently melted or controlled with the application of electric current from a source 116. In some examples, a controller of a microfluidic device reader 128 can provide independent control over the application of electric current to the different valve sections 126, as discussed below with reference to FIG. 8.

Figure 7B:
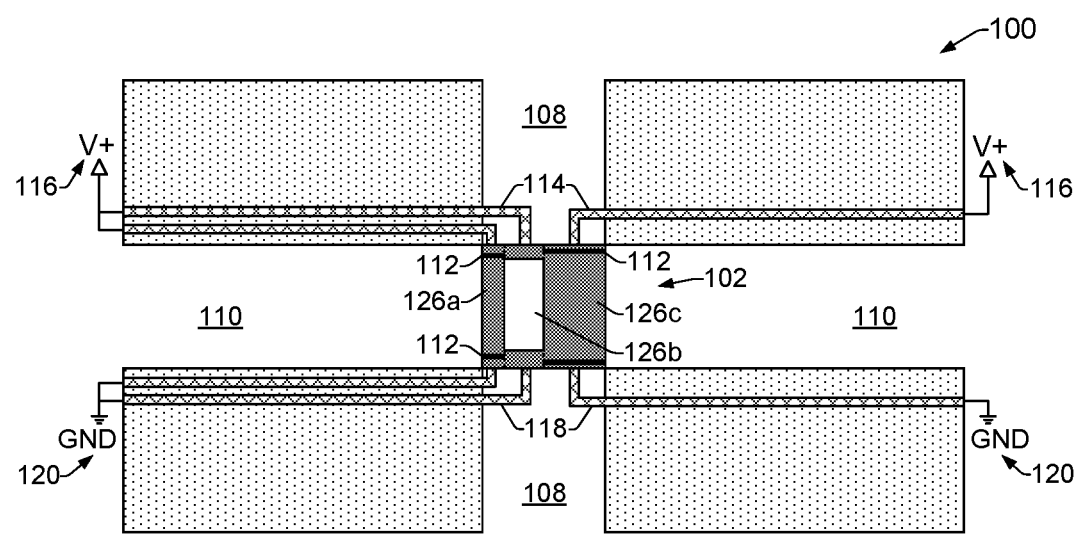

FIG. 7B shows a top view of the example microfluidic device 100 of FIG. 7A where a section of the conductive membrane valve 102 has been actuated or opened. As shown in FIG. 7B, valve section 126b has been opened to enable the flow of reagent fluid between the two microfluidic channels 108, 110. Because the conductive membrane valve 102 is positioned between the two microfluidic channels 108, 110, and considering the top view shown in FIG. 7B, the flow of reagent fluid between the two channels would proceed in directions that are into and out of the page.

FIG. 8 shows an example of a microfluidic device reader 128 suitable to receive a microfluidic device 100 and provide electric current to controllably actuate, or open, a conductive membrane valve 102 and/or different sections of a conductive membrane valve 102 to enable the flow of fluid reagents between microfluidic channels within the microfluidic device 100. The device reader 128 can include a mounting station 129 for receiving a microfluidic device 100, a user interface 130 such as a touch-sensitive display screen, substance reading components 132, a power source 134, and a controller 136. Substance reading components 132 can include, for example, a light source and a photo-detector to facilitate an analysis of samples, reagent fluids and other substances during a substance detection process.

As shown in FIG. 8, an example controller 136 can include a processor (CPU) 138 and a memory 140. The controller 136 may additionally include other electronics (not shown) for communicating with and controlling various components of the device reader 128. Such other electronics can include, for example, discrete electronic components and/or an ASIC (application specific integrated circuit). Memory 140 can include both volatile (i.e., RAM) and nonvolatile memory components (e.g., ROM, hard disk, optical disc, CD-ROM, magnetic tape, flash memory, etc.). The components of memory 140 comprise non-transitory, machine-readable (e.g., computer/processor-readable) media that can provide for the storage of machine-readable coded program instructions, data structures, program instruction modules, and other data and/or instructions executable by a processor 138 of the device reader 128.

An example of executable instructions to be stored in memory 140 include instructions associated with modules 142 and 144. In general, modules 142 and 144 include programming instructions and/or data executable by processor 138 to cause the device reader 128 to perform operations related to controlling electrically conductive membrane valves 102 on a microfluidic device 100, and to detect, read, and analyze substances on such microfluidic devices 100. For example, the valve module 142 can include executable instructions that cause the device reader 128 to provide pulses of electric current through electrodes to different conductive membrane valves 102, or to different sections of a conductive membrane valve 102 of a microfluidic device 100, as discussed above with reference to FIGS. 1-7. Similarly, the substance reading and detection module 144 can include executable instructions that cause the device reader 132 to control a light source and a photodetector to facilitate an analysis of reagent fluids or other substances during a substance detection process.

Figure 9:
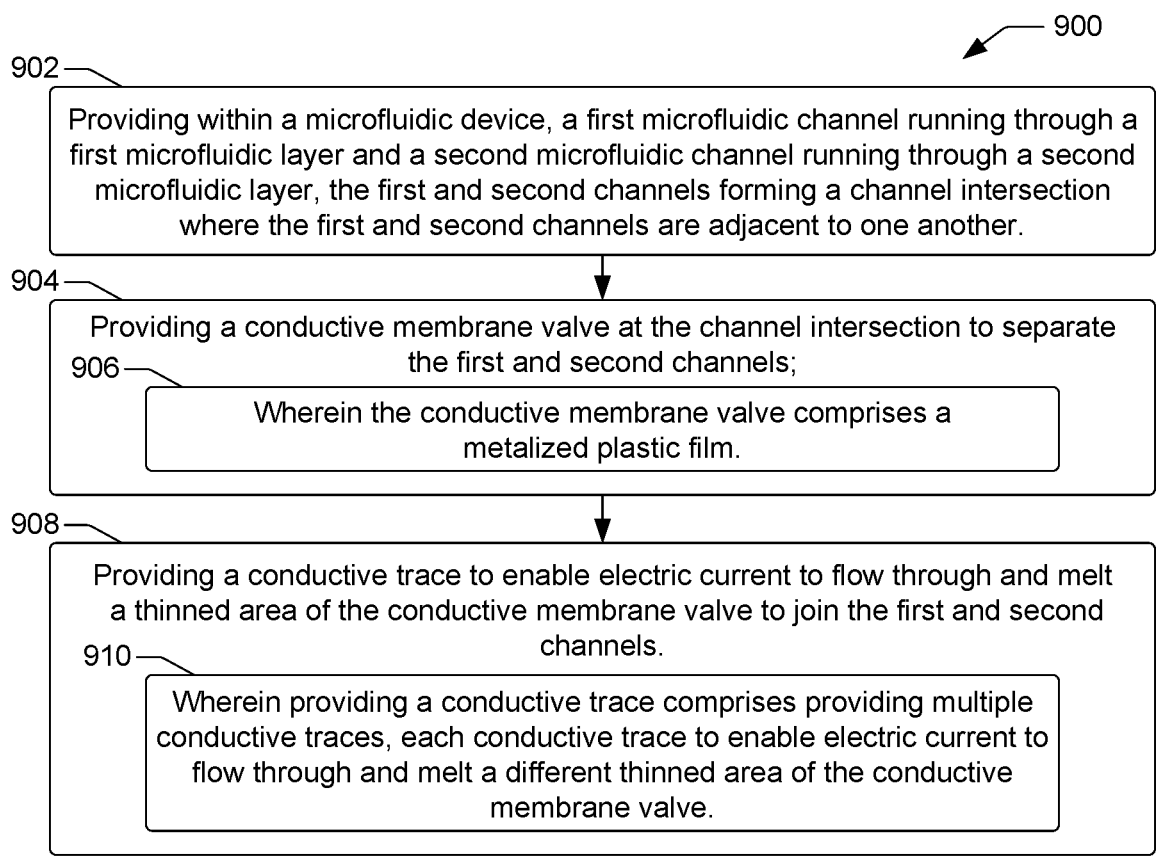

FIG. 9 shows a flow diagram of an example method 900 of joining microfluidic channels within a microfluidic device, for example with an electrically conductive membrane valve. The example method 900 is associated with examples discussed above with respect to FIGS. 1-8, and details of the operations shown in method 900 can be found in the related discussion of such examples. The method 900 may include more than one implementation, and different implementations of method 900 may not employ every operation presented in the flow diagram of FIG. 9. Therefore, while the operations of method 900 are presented in a particular order within the flow diagram, the order of their presentation is not intended to be a limitation as to the order in which the operations may actually be implemented, or as to whether all of the operations may be implemented. For example, one implementation of method 900 might be achieved through the performance of a number of initial operations, without performing some subsequent operations, while another implementation of method 900 might be achieved through the performance of all of the operations.

Referring now to the flow diagram of FIG. 9, an example method of joining microfluidic channels within a microfluidic device begins at block 902 with providing within a microfluidic device, a first microfluidic channel running through a first microfluidic layer and a second microfluidic channel running through a second microfluidic layer. The first and second microfluidic channels form a channel intersection where the channels are adjacent to one another. The method of joining the microfluidic channels also includes providing a conductive membrane valve at the channel intersection to separate the first and second channels, as shown at block 904. The conductive membrane valve can extend between the two channels at the channel intersection such that it provides a barrier that is impermeable to both gas and liquid reagents that may be in the two channels. In some examples, the conductive membrane valve can comprise a metalized plastic film, as shown at block 906.

A method of joining microfluidic channels can include providing a conductive trace to enable electric current to flow through and melt a thinned area of the conductive membrane valve, as shown at block 908. The melting of the thinned area of the membrane valve can open the valve and join the first and second channels. In some examples, as shown at block 910, providing a conductive trace comprises providing multiple conductive traces. Thus, each conductive trace can enable electric current to flow through and melt a different thinned area of the conductive membrane valve, effectively making the conductive membrane valve a variable flow control valve.

What is claimed is:

1. A microfluidic device comprising:
   a first layer with a first microfluidic channel;
   a second layer with a second microfluidic channel, wherein the first and second channels are adjacent to one another at a channel intersection;
   a one-time openable, conductive membrane valve having two layers comprising a metal layer adjacent to a plastic layer, the membrane valve having a thinned region, and the membrane valve extending across and covering the channel intersection to separate the first and second channels;
   an electrically conductive trace coupled to the membrane valve to supply an electric current through the membrane valve to heat and disintegrate the thinned region of the membrane valve and join the first and second channels.

2. A device as in claim 1, wherein the thinned region is located along one side of the membrane valve to enable a valve gate to swing open upon disintegration of the thinned region.

3. A device as in claim 1, wherein the thinned region comprises first and second thinned regions respectively located along first and second opposing sides of the membrane valve to enable a valve gate to separate from the membrane valve upon disintegration of the thinned regions.

4. A device as in claim 1, wherein the thinned region comprises multiple thinned regions and the conductive trace comprises multiple conductive traces, each conductive trace to supply current to a corresponding thinned region to open a corresponding section of the membrane valve.

5. A device as in claim 1, wherein the membrane valve comprises a thermal insulative coating to reduce heat transfer from the thinned region into a substance within the microfluidic channels.

6. A device as in claim 1, wherein the membrane valve comprises an inert material coating to prevent chemical interaction between a substance within a microfluidic channel and a material of the membrane valve.

7. A device as in claim 6, wherein the inert material coating is selected from the group consisting of Au, Pt, SiO2, parlene (Poly-Para-Xylylene), silicones, polyurethanes, and fluorinated ethylene-propylene.

8. A device as in claim 1, wherein the membrane valve comprises a three-layer metalized plastic membrane, the three layers of the metalized plastic membrane comprising:
   a first metal membrane;
   a second metal membrane; and
   a plastic membrane sandwiched between the first and second metal membranes.

9. A device as in claim 1, wherein the electrically conductive trace is to supply a current pulse with a duration less than $0.01 L2/D$, where L comprises a characteristic diameter of the microfluidic channels and D comprises the thermal diffusivity of fluid within the microfluidic channels.

10. A device as in claim 1, wherein the conductive trace comprises:
    a source electrode coupled to a first side of the membrane valve; and,
    a sink electrode coupled to a second side of the membrane valve.

11. A method of joining microfluidic channels in a microfluidic device, comprising:
    providing within a microfluidic device, a first microfluidic channel running through a first microfluidic layer and a second microfluidic channel running through a second microfluidic layer, the first and second channels forming a channel intersection where the first and second channels are adjacent to one another;
    providing a one-time openable, multilayer, conductive membrane valve at the channel intersection to separate the first and second channels, the conductive membrane valve comprising a metal layer adjacent to a plastic layer and an area with a thinned region; and,
    providing a conductive trace to enable electric current to flow through and melt the thinned region of the conductive membrane valve to join the first and second channels.

12. A method as in claim 11, wherein providing a conductive trace comprises providing multiple conductive traces, each conductive trace to enable electric current to flow through and melt a different thinned region of the conductive membrane valve.

13. A method as in claim 11, wherein the conductive membrane valve comprises a metalized plastic film.

14. A microfluidic valve in a microfluidic device comprising:
    an electrically conductive membrane valve extended between two microfluidic channels at an intersection of the channels within the microfluidic device, the membrane valve comprising a metal layer adjacent to a plastic layer;
    a thinned cross-sectional area formed in the membrane valve; and,
    an electrically conductive trace coupled to the membrane valve to enable an electrical current to flow through the membrane valve, the electrical current to heat up and melt the thinned cross-sectional area and cause the membrane valve to open.

* * * * *